US009509162B2

(12) United States Patent
Carpenter, Jr. et al.

(10) Patent No.: US 9,509,162 B2
(45) Date of Patent: Nov. 29, 2016

(54) SINGLE-STAGE AC-TO-DC SWITCHING CONVERTER THAT DIRECTLY CHARGES A BATTERY REQUIRING A MULTI-STATE CHARGING PROFILE

(71) Applicant: Active-Semi, Inc., Tortola (VG)

(72) Inventors: John H. Carpenter, Jr., Allen, TX (US); Hong Mao, Allen, TX (US); Wan Nian Huang, Hong Kong (CN)

(73) Assignee: Active-Semi, Inc. (VG)

( * ) Notice: Subject to any disclaimer, the term of this patent is extended or adjusted under 35 U.S.C. 154(b) by 0 days.

(21) Appl. No.: 14/700,363

(22) Filed: Apr. 30, 2015

(65) Prior Publication Data
US 2016/0322834 A1    Nov. 3, 2016

(51) Int. Cl.
*H02J 7/00* (2006.01)
*H02M 7/30* (2006.01)

(52) U.S. Cl.
CPC .............. *H02J 7/007* (2013.01); *H02J 7/0052* (2013.01); *H02M 7/30* (2013.01)

(58) Field of Classification Search
CPC ................................... H02J 7/00; H02J 7/04
USPC .......................................................... 320/162
See application file for complete search history.

(56) References Cited

U.S. PATENT DOCUMENTS

| | | | | |
|---|---|---|---|---|
| 5,710,506 A * | 1/1998 | Broell | .................. | H02J 7/0073 320/145 |
| 7,990,106 B2 * | 8/2011 | Hussain | .................. | H02J 7/045 320/128 |
| 8,232,776 B2 * | 7/2012 | Tatebayashi | ........ | H01M 10/441 320/116 |
| 8,299,760 B2 * | 10/2012 | Sato | ...................... | H01M 10/46 320/107 |
| 2003/0038612 A1 * | 2/2003 | Kutkut | .............. | H02M 3/33561 320/140 |
| 2004/0212347 A1 * | 10/2004 | Fogg | .................. | G01R 31/3606 320/127 |
| 2005/0275373 A1 * | 12/2005 | Guang | .................. | H02J 7/0006 320/116 |
| 2008/0174269 A1 * | 7/2008 | DeRome | ............... | H02J 7/0045 320/110 |
| 2009/0289596 A1 * | 11/2009 | McGinley | ............. | H02J 7/0042 320/111 |
| 2011/0115442 A1 * | 5/2011 | Garrastacho | ....... | G01R 31/3637 320/157 |
| 2012/0133325 A1 * | 5/2012 | Thomas | ................ | H02J 7/0004 320/109 |

OTHER PUBLICATIONS

ADP3810/ADP3811 Data sheet, "Secondary Side, Off-Line Battery Charger Controllers", Analog Devices,Inc., 17 pages, (1996).
www.analog.com/library/analogDialogue/archives/31-2/lion.html, "Analog Dialogue: Li-Ion Battery Charging Requires Accurate Voltage Sensing—New Battery Charger Controller Guarantees 1% Final Battery Voltage Accuracy", by Joe Buxton, 2 pages as printed out, downloaded Apr. 4, 2015.

* cited by examiner

*Primary Examiner* — Richard Isla Rodas
*Assistant Examiner* — Dung V Bui
(74) *Attorney, Agent, or Firm* — Imperium Patent Works; T. Lester Wallace; Amir V. Adibi

(57) ABSTRACT

A multi-state battery charger includes a single-stage AC-to-DC switching converter, where the single-stage converter receives an AC supply voltage and directly charges a rechargeable battery without there being any intervening second power stage. A novel battery charger controller integrated circuit in the converter's secondary side detects profile selection resistor values, monitors battery voltage, monitors charging current, monitors battery temperature, controls a protection transistor, and sends a control signal back to a PWM in the primary side. The controller includes a flexible preprogrammed digital state machine circuit that is configured to control the converter from charging state to charging state so that the battery is charged in accordance with a selected one of multiple preprogrammed different multi-state battery charging profiles, where at least one of the profiles has at least one CC (constant current) state and one CV (constant voltage) state.

21 Claims, 10 Drawing Sheets

BATTERY CHARGER DEVICE AND BATTERY ASSEMBLY

BATTERY CHARGER DEVICE AND
BATTERY ASSEMBLY

SINGLE-STAGE AC-TO-DC SWITCHING
CONVERTER BATTERY CHARGER

CURRENT SENSE
COMPARATORS CIRCUIT

VOLTAGE SENSE
COMPARATORS CIRCUIT

TEMPERATURE SENSE
COMPARATORS CIRCUIT

BATTERY CHARGING PROFILE
(EXAMPLE FOR T<0°C AND T<45°C)

JEITA GUIDELINES FOR CHARGING LI-ION BATTERIES

STATE MACHINE

FIG. 11A — STATE TABLE FOR STATE MACHINE

| CURRENT STATE | OUTPUT SIGNALS | | CONDITION OF INPUT SIGNALS CAUSING THE STATE TRANSITION | | | | | | | | | | | | | | | | NEXT STATE |
|---|---|---|---|---|---|---|---|---|---|---|---|---|---|---|---|---|---|---|---|
| | OUTPUT CONTROL SIGNAL | | V>2.00V | V>3.00V | V>4.00V | V>4.05V | V>4.10V | V>4.15V | V>4.25V | >50mA | >100mA | >200mA | >500mA | >1.6A | T<0°C | T<10°C | T<45°C | T<50°C | T>60°C | |
| OFF | PT=OFF | CC ICOMPARE=0mA | X | X | X | X | X | X | X | X | X | X | X | X | X | X | X | X | 1 | OFF |
| OFF | PT=OFF | CC ICOMPARE=0mA | X | X | X | X | X | X | X | X | X | X | X | X | 1 | X | X | X | X | OFF |
| OFF | PT=ON | CC ICOMPARE=0mA | 0 | X | X | X | X | X | X | X | X | X | X | X | 0 | X | X | X | 0 | SHORT |
| OFF | PT=ON | CC ICOMPARE=0mA | 1 | 0 | X | X | X | X | X | X | X | X | X | X | 0 | X | X | X | 0 | PRECH. |
| OFF | PT=ON | CC ICOMPARE=0mA | 1 | 1 | 0 | X | X | X | X | X | X | X | X | X | 0 | X | X | X | 0 | FAST |
| OFF | PT=OFF | CC ICOMPARE=0mA | 1 | 1 | 1 | X | X | X | X | X | X | X | X | X | 0 | X | X | X | 0 | OFF |
| OFF | PT=ON | CC ICOMPARE=0mA IF T<0=0 AND T<45=1 | X | X | X | X | X | X | 0 | X | X | X | X | X | X | 1 | X | X | 0 | CV |
| OFF | PT=ON | CC ICOMPARE=0mA IF T<45=0 AND T<50=1 | X | X | X | 0 | X | X | X | X | X | X | X | X | X | 0 | 1 | X | 0 | CV |
| OFF | PT=ON | CC ICOMPARE=0mA IF T<50=0 AND T>60=0 | X | X | 0 | X | X | X | X | X | X | X | X | X | X | 0 | X | 0 | 0 | CV |
| SHORT | PT=OFF | CC ICOMPARE=50mA | X | X | X | X | X | X | X | X | X | X | X | X | X | X | X | X | 1 | OFF |
| SHORT | PT=OFF | CC ICOMPARE=50mA | X | X | X | X | X | X | X | X | X | X | X | X | 1 | X | X | X | X | OFF |
| SHORT | PT=ON | CC ICOMPARE=50mA | 1 | X | X | X | X | X | X | X | X | X | X | X | 0 | X | X | X | 0 | PRECH. |
| SHORT | PT=ON | CC ICOMPARE=50mA | 0 | X | X | X | X | X | X | X | X | X | X | X | 0 | X | X | X | 0 | SHORT |
| PRECH. | PT=OFF | CC ICOMPARE=200mA | X | X | X | X | X | X | X | X | X | X | X | X | X | X | X | X | 1 | OFF |
| PRECH. | PT=OFF | CC ICOMPARE=200mA | X | X | X | X | X | X | X | X | X | X | X | X | 1 | X | X | X | X | OFF |
| PRECH. | PT=ON | CC ICOMPARE=200mA | X | 1 | X | X | X | X | X | X | X | X | X | X | 0 | X | X | X | 0 | FAST |
| PRECH. | PT=ON | CC ICOMPARE=200mA | X | 0 | X | X | X | X | X | X | X | X | X | X | 0 | X | X | X | 0 | PRECH. |

STATE TABLE FOR STATE MACHINE

SINGLE-STAGE DC-TO-DC SWITCHING CONVERTER BATTERY CHARGER

SINGLE-STAGE AC-TO-DC SWITCHING CONVERTER THAT DIRECTLY CHARGES A BATTERY REQUIRING A MULTI-STATE CHARGING PROFILE

TECHNICAL FIELD

The present disclosure relates generally to battery charger devices and to related structures and methods.

BACKGROUND INFORMATION

There are several circuits and topologies of battery chargers for charging rechargeable batteries. In the case of a relatively large capacity battery of the type used in cordless power tools, the battery charger involves an AC-to-DC switching converter that receives AC wall power and that outputs a conditioned DC voltage supply. An efficient DC-to-DC switching converter is powered by the DC voltage supply. This DC-to-DC switching converter handles charging the battery. This same basic topology and circuit partitioning is used for other types of rechargeable batteries and for batteries of different capacities. For example in the case of an auxiliary solar-powered battery charger for charging the battery in a cellular telephone, a first power stage having solar cells outputs a supply voltage. The amount of current output by the solar cells varies considerably, depending on the amount of light incident on the solar cells. This supply voltage is supplied to the cellular telephone via a connector such as a USB (Universal Serial Bus) connector. Within the cellular telephone is a charger circuit that is especially adapted to charge the particular type of rechargeable battery that is part of the cellular telephone. The charger circuit receives power via the USB connector, and conditions it and supplies power to the battery at the appropriate voltage and current, in accordance with the proper charging profile for the type of rechargeable battery within the cellular telephone. Due to this circuit partitioning, the battery within the cellular telephone can alternatively be charged via the USB connector by a large number of devices that output a supply voltage to a USB plug, such as for example a car adapter, an auxiliary battery pack, or an AC-to-DC wall adapter. In each case, the second power stage within the cellular telephone is specially adapted to charge the battery in accordance with the proper charging profile. This two-stage partitioning and topology is desirable in that the second stage is made to tailor to the needs of the particular rechargeable battery. If the current demands are low enough, and if the supply voltage supplied to the second stage is appropriate, then the two-stage circuit partitioning is even more desirable because linear power conversion can be employed in the second stage, thereby reducing cost and complexity and size of the overall battery charger circuit. Depending on the particular type of battery charger, the connection and connector between the two stages may be a USB connector (USB plug and USB socket), a barrel connector (barrel plug and socket), a battery pack stand, a docking connector, or other type of connector.

SUMMARY

A multi-state battery charger includes a single-stage AC-to-DC switching converter, where the single-stage AC-to-DC switching converter receives an AC supply voltage and then directly charges a rechargeable battery (without any intervening second power "stage"), where there is a battery charger controller integrated circuit in the secondary side of the AC-to-DC switching converter that monitors the voltage of the battery and that monitors the current being supplied to the battery. The battery charger controller also includes a flexible preprogrammed digital state machine circuit. The overall "multi-state battery charger" has at least one Constant Current (CC) state and one Constant Voltage (CV) state, and where the secondary side battery charger controller integrated circuit controls a Pulse Width Modulator (PWM) in the primary side such that the battery is directly charged in accordance with a "multi-state battery charging profile" that includes the CC state and the CV state. The digital state machine circuit is preprogrammed to implement a selectable one of a plurality of different digital state machines, where the selected digital state machine controls battery charging in accordance with corresponding selectable one of a plurality of battery charging profiles. When the overall multi-state battery charger is the CC state then the selected and active digital state machine is in a first state, and when the overall multi-state battery charger is the CV state then the selected and active digital state machine is in a second state. Each of two external profile selection resistors has a resistance value that is one of a plurality of determinable resistance ranges. The secondary side battery charger controller reads the resistances of the two external profile selection resistors, determines the resistance ranges, and encodes the combination of the resistance ranges into a binary value. The binary value then determines which one of the preprogrammed battery charging profiles will be used and how the digital state machine circuit will be configured. The selected digital state machine that is in use controls an output signal that in turn causes an external protection transistor to turn on and off. This external protection transistor is disposed in the charging current path between the primary side of the AC-to-DC switching converter and the battery being charged. Under certain fault conditions (for example, a battery over-temperature condition, a battery under-temperature condition, a battery over-voltage condition, and a battery under-voltage condition), and in the case of the battery being discharged in normal use when there is no charging going on, the digital state machine controls the external protection transistor to be fully off, otherwise the digital state machine controls the external protection transistor to be fully on. Charging the battery directly from the single AC-to-DC switching converter as described above improves headroom as compared to the headroom that would otherwise be available if a multi-power stage topology were used, improves system efficiency as compared to a multi-stage topology, provides for faster charging times, and allows the single switching stage that charges the battery to be any converter that can receive and respond to the type of feedback signal output by the novel secondary side battery charger controller integrated circuit.

The foregoing is a summary and thus contains, by necessity, simplifications, generalizations and omissions of detail; consequently it is appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 11A is a first part of a state table for the digital state machine of FIG. 10.

FIGS. 11A and 11B together form a single larger diagram of the state table.

DETAILED DESCRIPTION

Reference will now be made in detail to background examples and some embodiments of the invention, examples of which are illustrated in the accompanying drawings.

Figure 1:
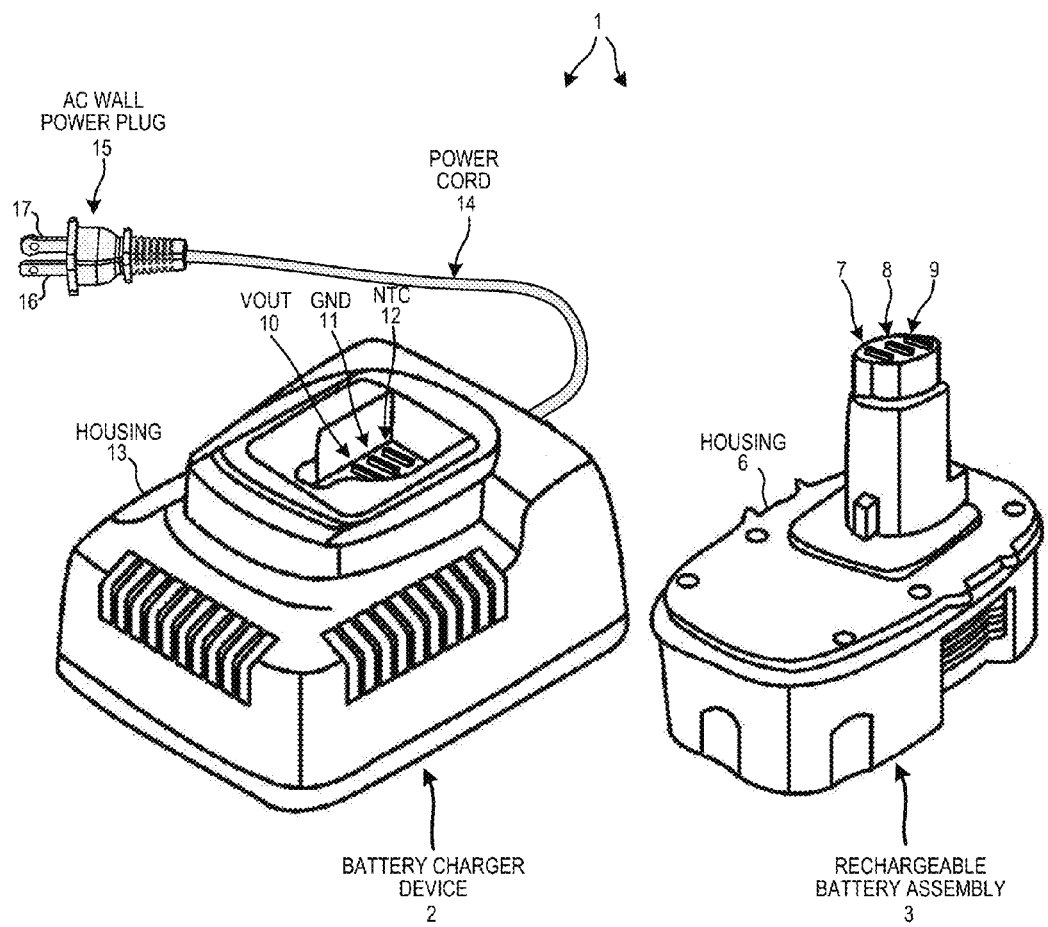
FIG. 1 is a perspective diagram of a single-stage AC-to-DC switching converter battery charger device and a rechargeable battery assembly in accordance with one novel aspect.

FIG. 1 is a diagram of a specific exemplary embodiment of a system 1 in accordance with one novel aspect. The system 1 comprises a battery charger device 2 and a rechargeable battery assembly 3. The rechargeable battery assembly 3 involves a 2000 mAh 18 volt rechargeable lithium ion battery 4 and an NTC thermistor 5 disposed in a plastic housing 6. The rechargeable battery assembly 3 has a DC voltage terminal (VDC) 7, a ground terminal (GND) 8, and an NTC thermistor terminal 9. The terminals 7, 8 and 9 make contact with corresponding terminals 10, 11 and 12 of the battery charger device 2 when the neck of the battery assembly 3 is inserted into a receiving slot of the battery charger device 2. The battery charger device 2 further includes a single-stage AC-to-DC switching converter circuit 18 that is disposed in a plastic housing 13, and a power cord 14 that terminates in an AC wall power plug 15. The AC wall power plug 15 has two AC supply voltage input terminals 16 and 17. The AC wall power plug 15 is a standard NEMA (National Electrical manufacturers Association) wall power plug that has two metal terminal blades. When the battery assembly 3 is plugged into the battery charger device 2 and the AC wall power plug is plugged into a 110 volt AC (Alternating Current) RMS (Root Mean Square) wall socket, then the single-stage AC-to-DC switching converter circuit 18 of the battery charger device 2 receives a 110 volt AC RMS 60 Hz sinusoidal supply voltage via the pair of AC supply voltage input terminals 16 and 17 and the power cord 14 and supplies a charging current through the output terminals 10 and 11 to the battery 4 such that the battery 4 is charged in accordance with a selected multi-state battery charging profile, where the selected multi-state battery charging profile includes at least one constant current (CC) charging state and at least one constant voltage (CV) charging state.

Figure 2:
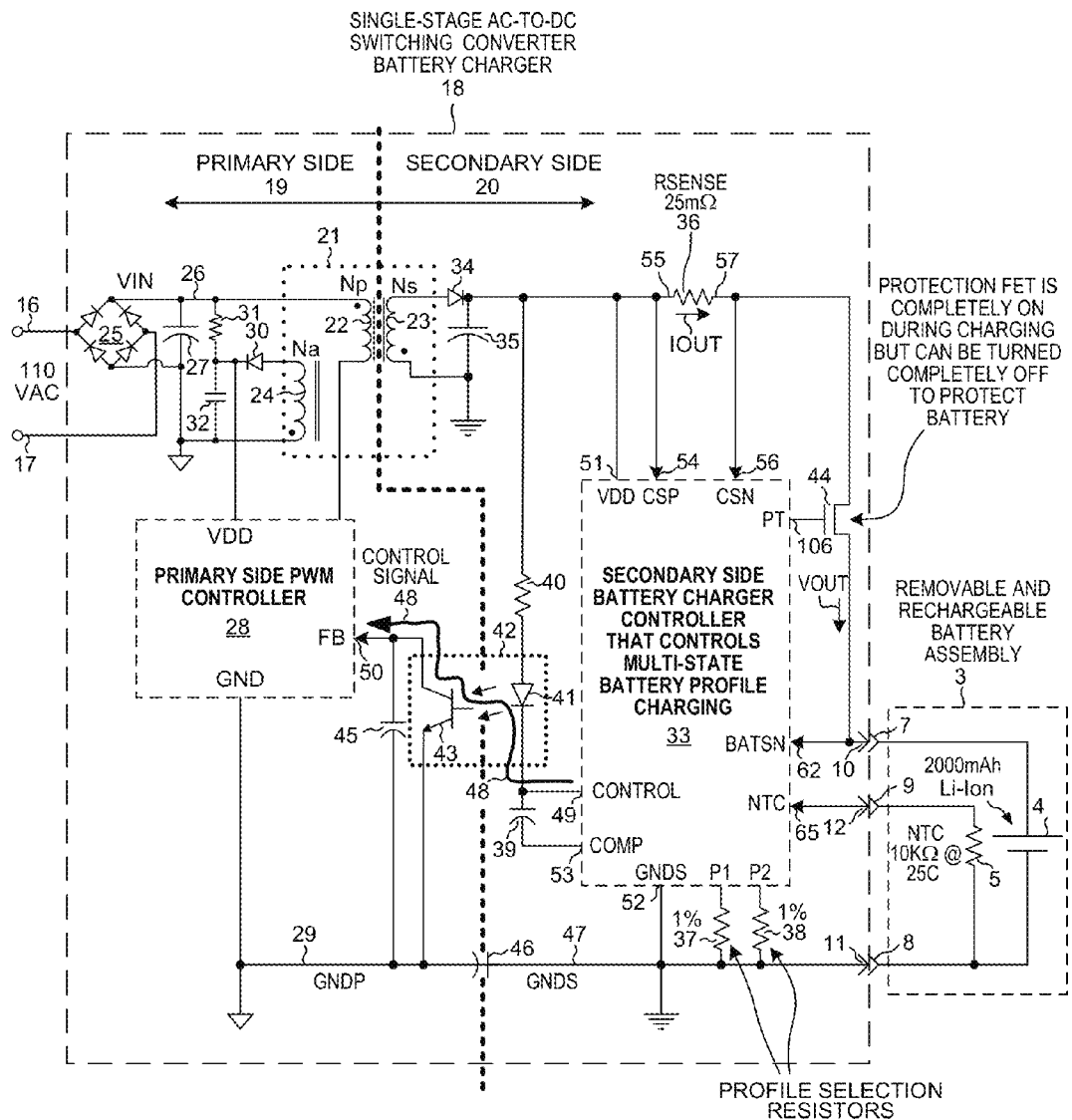
FIG. 2 is a circuit diagram of the single-stage AC-to-DC switching converter battery charger device and the rechargeable battery assembly of FIG. 1.

FIG. 2 is a more detailed circuit diagram of the single-stage AC-to-DC switching converter circuit 18. The AC-to-DC switching converter circuit 18 is a flyback converter that comprises a primary side circuit 19 and a secondary side circuit 20. The battery charger device 2 includes one and only one power transformer 21. Transformer 21 includes a primary winding 22, a secondary winding 23, and an auxiliary winding 24. The 110 VAC supply voltage is rectified by a full-wave bridge rectifier 25 into a rough DC voltage on VIN node 26. Capacitor 27 is a smoothing capacitor. A pull-down power Field Effect Transistor (FET) in a primary side pulse-width modulator controller integrated circuit 28 can be turned on to pull current from VIN node 26, through the primary winding 22, and through the integrated circuit 28 to a GNDP ground node 29. The auxiliary winding 24 together with components 30-32 form a power supply circuit that supplies power to the primary side PWM controller integrated circuit 28. The on duty cycle of the FET is modulated so as to control the voltage and current that is supplied to the battery through the secondary side 20. The frequency at which the FET is switched on and off is typically fixed, and this example is 30 kHz. In other examples, however, the primary side PWM controller integrated circuit used is one that uses a variable frequency in addition to duty cycle control to adjust the output voltage.

The secondary side circuit 18 includes a novel secondary side battery charger controller integrated circuit 33, a rectifying diode 34, an output capacitor 35, a 25 milliohm current sense resistor 36, two profile selection resistors 37 and 38, a loop compensation capacitor 39, a current limiting resistor 40, and an external battery protection Field Effect Transistor (FET) 44. Capacitor 45 is a smoothing capacitor for an optocoupler 42. The resistance of resistor 40 is selected to accommodate the gain curve of the particular optocoupler used. Capacitors 39 and 45 affect the characteristics of the control loop and the values of these capacitors are determined as is known in the art. Capacitor 46 allows the primary side ground GNDP on node 29 to be isolated and separate from the secondary side ground GNDS on node 47.

As the overall flyback converter operates, the secondary side battery charger controller integrated circuit 33 monitors the voltage VOUT on the output terminal 10 and monitors the current TOUT passing through the current sense resistor 36. The secondary side battery controller integrated circuit 33 generates a control signal 48 based on one or both of these quantities (IOUT or VOUT). The direction of the arrow 48 representing the control signal 48 in FIG. 2 represents the direction of information flow, and does not represent a direction of current flow even though the signal at points in the signal path is a current signal. The control signal 48 passes out of the control terminal (CONTROL) 49 of the secondary side battery charger controller integrated circuit 33, through the optocoupler 42, and into the feedback input terminal (FB) 50 of the primary side PWM controller integrated circuit 28. In this example, if the output voltage VOUT on output terminal 10 is too high, then more current is pulled into the CONTROL terminal 49, and then the optocoupler 42 pulls more current from the FB terminal 50 of the primary side controller 28 (sinks more current to ground), so the voltage of the control signal on the FB terminal 50 decreases, and decreasing the voltage on the FB terminal 50 causes the on duty cycle of the primary side FET to be decreased. Alternatively, if the output voltage VOUT on output terminal 10 is too low, then less current is pulled into the CONTROL terminal 49 (sinks less current to ground), and then the optocoupler 42 pulls less current from the FB terminal 50 of the primary side controller 28, so the voltage of the control signal on the FB terminal 50 increases, and increasing the voltage on the FB terminal 50 causes the on duty cycle of the primary side FET to be increased. The diode transmitter 41 part of optocoupler 42 is considered to be part of the secondary side circuit 20, whereas the phototransistor 43 part of optocoupler 42 is considered to be part of the primary side circuit 19.

Figure 3:
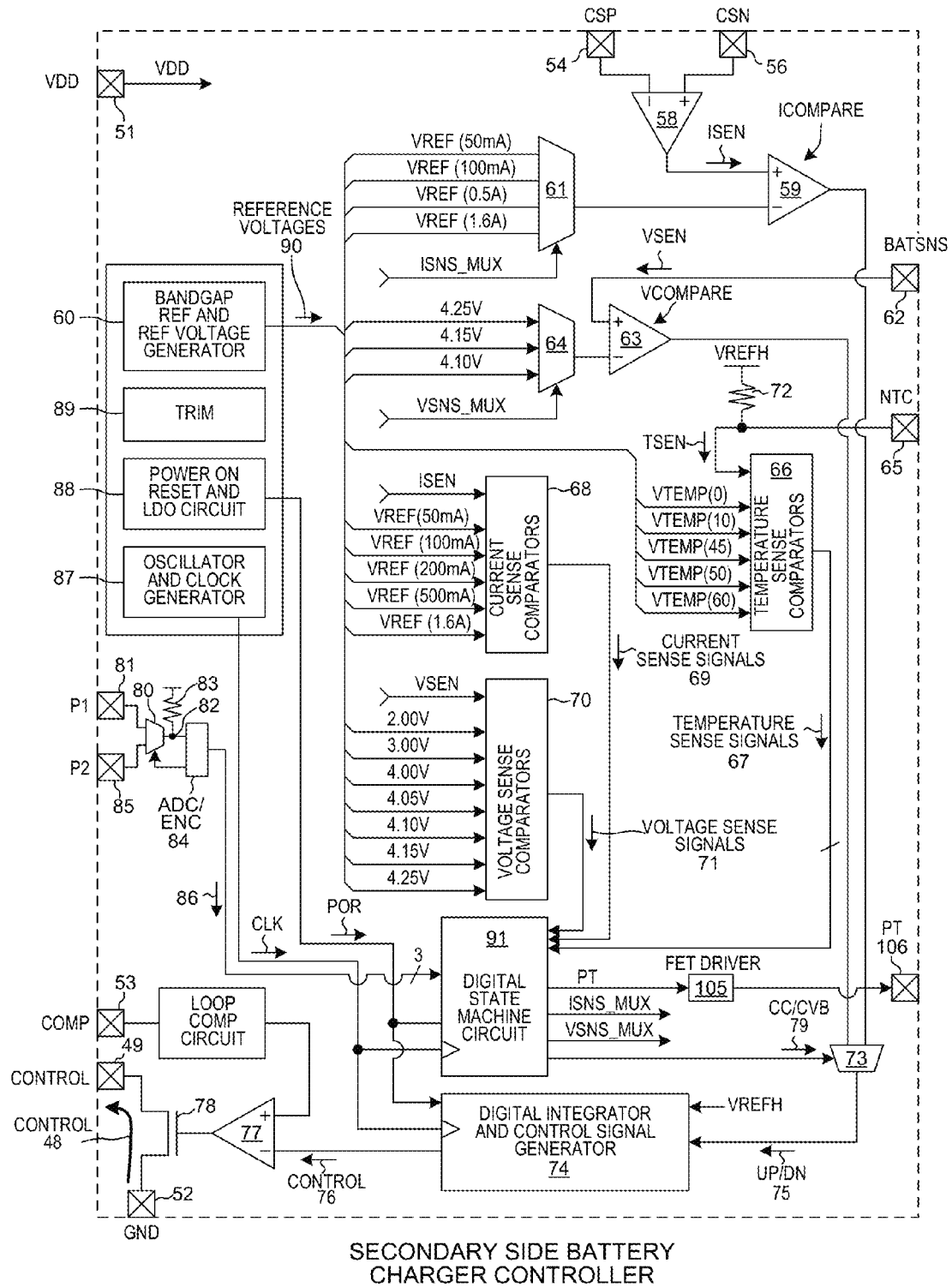
FIG. 3 is diagram of the secondary side battery charger controller integrated circuit of FIG. 2.

FIG. 3 is a more detailed circuit diagram of the secondary side battery charger controller integrated circuit 33 of FIG. 2. The circuitry of the integrated circuit is powered by the supply voltage received on the VDD terminal 51. Terminal 52 is the ground terminal of the integrated circuit. The ground terminal 52 is used for the ground for digital circuitry of the integrated circuit and is also used as the current sink for current of the control signal 48. The loop compensation capacitor 39 described in connection with FIG. 2 is coupled between the control terminal 49 and a compensation terminal 53.

Current Sense For Loop Control: The CSP terminal 54 is coupled to a first lead 55 of the current sense resistor 36, and the CSN terminal 56 is coupled to a second lead 57 of the current sense resistor 36, so that magnitude of the voltage drop across the current sense resistor 36 will be amplified by amplifier 58. The amplified voltage drop is the voltage signal ISEN in FIG. 3. An ICOMPARE comparator 59 compares this voltage to a selected one of a plurality of reference voltages VREF (50 mA), VREF (100 mA), VREF (0.5 A) and VREF 1.6 A). These reference voltages are generated by a bandgap reference and reference voltage generator circuit 60. Which one of these reference voltages it is that is supplied to comparator 59 is determined by a reference voltage selector circuit 61. The reference voltage selector circuit 61 in this case is an analog multiplexer. The magnitude of the VREF (50 mA) voltage is the voltage at which the voltage signal ISEN will be if 50 mA is flowing through the current sense resistor 36; the magnitude of the VREF (100 mA) voltage is the voltage at which the voltage signal ISEN will be if 100 mA is flowing through the current sense resistor 36; the magnitude of the VREF (0.5 A) voltage is the voltage at which the voltage signal ISEN will be if 0.5 A is flowing through the current sense resistor 36; and the magnitude of the VREF (1.6 A) voltage is the voltage at which the voltage signal ISEN will be if 1.6 A is flowing through the current sense resistor 36. By proper control of the reference voltage selector circuit 78, the ICOMPARE comparator 59 can be made to output a digital signal that indicates whether the magnitude of current flowing through the current sense resistor is greater or a selected one of 50 mA, 100 mA, 0.5 A and 1.6 A. The ICOMPARE comparator 59 is a comparator circuit that exhibits hysteresis as is known in the art.

Voltage Sense For Loop Control: The voltage VOUT on the voltage output terminal 10 is received onto the secondary side battery charger controller integrated circuit 33 via BATSN terminal 62. A VCOMPARE comparator 63 compares this voltage to a selected one of a plurality of voltages 4.25V, 4.15V and 4.10V. Which one of these reference voltages it is that is supplied to comparator 63 is determined by a reference voltage selector circuit 64. The reference voltage selector circuit 64 in this case is an analog multiplexer. These reference voltages 4.25V, 4.15V and 4/10V are generated by the bandgap reference and reference voltage generator circuit 60. By proper control of the reference voltage selector circuit 64, the VCOMPARE comparator 63 can be made to output a digital signal that indicates whether the magnitude of voltage VOUT on the output terminal 10 is greater than a selected one of 4.25 volts, 4.15 volts, and 4.10 volts. The VCOMPARE comparator 63 is a comparator circuit that exhibits hysteresis as is known in the art.

The voltage on the NTC terminal 12 of the battery charger device 2 is received onto the secondary side battery charger controller integrated circuit 33 via NTC terminal 65. Together a pullup resistor 72 and the NTC thermistor 5 form a voltage divider between VREFH and ground potential, where the voltage on the center node at the NTC terminal 65 is indicative of the temperature of the thermistor. Increasing the temperature of the battery causes TSEN to decrease, whereas decreasing the temperature of the battery causes TSEN to increase. Temperature sense comparators circuit 66 compares the voltage TSEN on the NTC terminal 65 to a voltage VTEMP(0), and in response outputs a digital signal T<0 C that indicates whether the temperature of the NTC thermistor 5 is less than 0 degrees Celsius. Temperature sense comparators circuit 66 also compares the voltage TSEN on the NTC terminal 65 to a voltage VTEMP(10), and in response outputs a digital signal T<10 C that indicates whether the temperature of the NTC thermistor 5 is less than 10 degrees Celsius. Temperature sense comparators circuit 66 also compares the voltage TSEN on the NTC terminal 65 to a voltage VTEMP(45), and in response outputs a digital signal T<45 C that indicates whether the temperature of the NTC thermistor 5 is less than 45 degrees Celsius. Temperature sense comparators circuit 66 also compares the voltage TSEN on the NTC terminal 65 to a voltage VTEMP(50), and in response outputs a digital signal T<50 C that indicates whether the temperature of the NTC thermistor 5 is less than 50 degrees Celsius. Temperature sense comparators circuit 66 also compares the voltage TSEN on the NTC terminal 65 to a voltage VTEMP(60), and in response outputs a digital signal T<60 C that indicates whether the temperature of the NTC thermistor 5 is less than 60 degrees Celsius. These five digital temperature sense signals T<0 C, T<10 C, T<45 C, T<50 C, and T<60 C are indicated together in FIG. 3 by the arrow 67 labeled temperature sense signals.

The voltage signal ISEN that is indicative of the voltage drop across the current sense resistor is also compared to five reference voltages by a current sense comparators circuit 68. The current sense comparators circuit 68 compares the ISEN voltage to the reference voltage VREF(50 mA), and outputs a digital current sense signal I>50 mA that indicates whether the current flowing through the current sense resistor is greater than 50 mA. The current sense comparators circuit 68 also compares the ISEN voltage to the reference voltage VREF(100 mA), and outputs a digital current sense signal I>100 mA that indicates whether the current flowing through the current sense resistor is greater than 100 mA. The current sense comparators circuit 68 also compares the ISEN voltage to the reference voltage VREF(200 mA), and outputs a digital current sense signal I>200 mA that indicates whether the current flowing through the current sense resistor is greater than 200 mA. The current sense comparators circuit 68 also compares the ISEN voltage to the reference voltage VREF(500 mA), and outputs a digital current sense signal I>500 mA that indicates whether the current flowing through the current sense resistor is greater than 500 mA. The current sense comparators circuit 68 also compares the ISEN voltage to the reference voltage VREF(1.6 A), and outputs a digital current sense signal I>1.6 A that indicates whether the current flowing through the current sense resistor is greater than 1.6 A. The digital current sense signals 1>50 mA, I>100 mA, I>200 mA, I>500 mA and I>1.6 A are indicated together in FIG. 3 by the arrow 69.

The voltage VSEN that is the voltage on the VOUT terminal 10 of the battery charger is compared to several reference voltages 2.00V, 3.00V, 4.00V, 4.05V, 4.10V, 4.15V and 4.25V. The voltage sense comparators circuit 70 in turn outputs digital signals V>2.00V, V.3.00V, V>4.00V, V>4.05V, V>4.10V, V>4.15V, and V>4.25V that indicate whether the voltage VOUT is greater than 2.00 volts, 3.00 volts, 4.00 volts, 4.05 volts, 4.10 volts, 4.15 volts, and 4.25 volts, respectively. The digital voltage sense signals V>2.00V, V.3.00V, V>4.00V, V>4.05V, V>4.10V, V>4.15V, and V>4.25V are indicated together in FIG. 3 by the arrow 71.

The secondary side battery charger controller integrated circuit 33 can control the overall flyback converter in a constant current (CC) mode, or in a constant voltage (CV) mode. In the constant current mode, the ICOMPARE comparator 59 outputs a signal indicative of the magnitude of current flow through the current sense resistor, and this signal is supplied as digital signal UP/DN 75 by analog multiplexer 73 to the Digital Integrator and Control Signal Generator Circuit (DICSGC) 74. DICSGC circuit 74 performs a type of integration (in the digital domain) on the current sense signal, and outputs an analog control signal 76, which in turn becomes the analog level control signal 48 that is output from the CONTROL terminal 49 and that passes through the optocoupler 42 to the primary side PWM controller. In this way, the current sense signal is used to control the feedback loop. As shown on FIG. 3, the analog control signal 76, via amplifier 77 and pull-down transistor 78, generates the analog control signal 48 by sinking more or less current to ground terminal 52. If, on the other hand, the secondary side battery charger controller integrated circuit 33 is controlling the overall flyback converter to be in a constant voltage (CV) mode, then the VCOMPARE comparator 63 outputs a signal indicative of the magnitude of voltage VOUT and this signal is supplied as digital signal UP/DN 75 by analog multiplexer 73 to the digital integrator and control signal generator 74. The digital signal CC/CVB 79 determines whether the current sense signal from the ICOMPARE comparator 59 or the voltage sense signal from the VCOMPARE comparator 63 will be used in the feedback control loop.

As is explained in further detail below, the battery charger device can be configured to charge a battery in accordance with a selected one of a plurality of battery charging profiles. In this example, which particular battery charging profile is used is determined by the resistance values of the two profile selection resistors 37 and 38. In other examples, other suitable ways of selecting the charging profile are used such as serial communication, RF communication, and optical communication. In this example, during a first time period, and analog multiplexer 80 is set to couple terminal P1 81 to node 82. A voltage divider is therefore formed from a reference voltage, through a pullup resistor 83, to node 82, and through the profile programming resistor 37, to ground. A simple Analog-to-Digital Converter (ADC) and encoder circuit 84 digitizes the voltage on the P1 terminal 81 into a first digital number, where the first digital number indicates one of five voltage ranges between the reference voltage and ground potential. After this is done, then the ADC/ENC circuit 84 sets the analog multiplexer 80 so that the voltage divider is formed with the other profile programming resistor 38 that is coupled to the P2 terminal 85. The ADC/ENC circuit 84 digitizes the voltage on the P2 terminal 85 into a second digital number, where the second digital number indicates one of five voltage ranges between the reference voltage and ground potential. The combination of the first digital number and the second digital number corresponds to one number of a set of possible numbers that can be specified by the resistor values of the two profile programming resistors. The encoder portion of the ACD/ENC 84 encodes the combination of the first and second digital numbers into a multi-bit digital value 86. The multi-bit digital value 86 indicates one of a plurality of battery charging profiles with which the battery charger device 2 is set to charge the battery 4.

An on-chip oscillator and clock signal generator circuit 87 generates clock signals, including a digital clock signal CLK. A power on reset circuit 88, following a power up condition, supplies a digital power on signal POR that is usable to reset all sequential logic elements in the chip in a reliable fashion. A trimmable circuit 89 is provided that allows the reference voltages 90 as output by the bandgap reference and reference voltage generator circuit 60 to be trimmed after integrated circuit manufacture. The secondary side battery charger controller integrated circuit 33 further includes, as described in more detail below, a preprogrammed digital state machine circuit 91.

Figure 4:
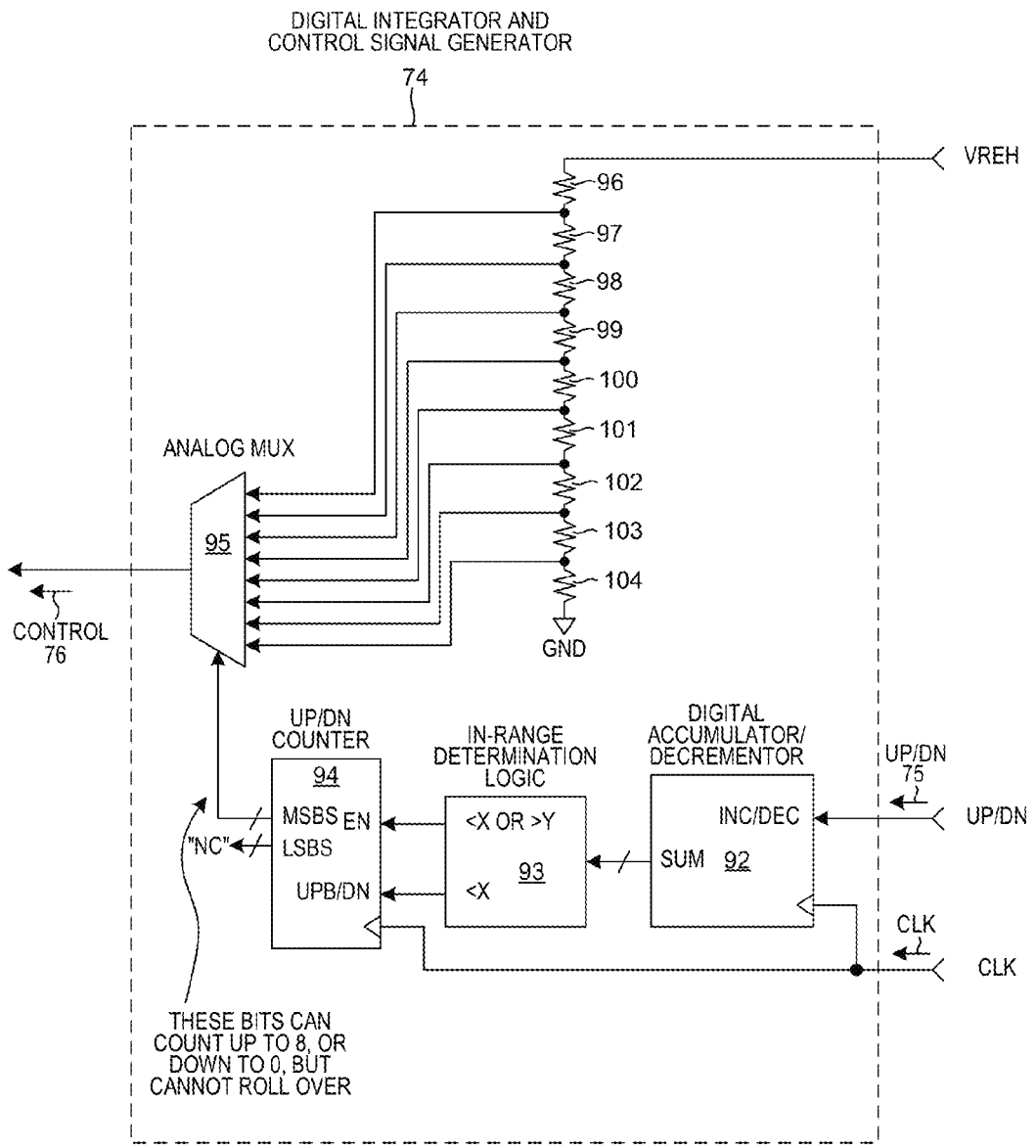
FIG. 4 is a circuit diagram of one example of the digital integrator and control signal generator circuit of FIG. 3.

FIG. 4 is a more detailed diagram of the digital integrator and control signal generator circuit 74 of FIG. 3. The digital UP/DN signal 75 is supplied onto the increment/decrement control lead of a digital accumulator/decrementer 92. If the digital accumulator/decrementer 92 receives a rising clock edge of the clock signal CLK when the UP/DN signal 75 is asserted, then the digital accumulator/decrementer 92 increments once. If the digital accumulator/decrementer 92 receives a rising clock edge of the clock signal CLK when the UP/DN signal 75 is deasserted, then the digital accumulator/decrementer 92 decrements once. The digital accumulator/decrementer 92 cannot rollover its count either by decrementing past its lowest count value of zero, nor by incrementing past its highest count value. The multi-bit digital accumulation value of the digital accumulator/decrementer 92 is output as the value SUM. An in-range determination logic circuit 93 determines whether the value SUM is not in a midrange of values (where the midrange is from a low range value of X to a high range value of Y) and outputs a digital signal (<X OR >Y) indicative of whether the SUM is in the midrange or not. The in-range determination logic circuit 93 also determines and outputs a digital signal (<X) indicative of whether the value SUM is below the low range value (i.e., between the low range value and a value of zero). An up/down counter 94 is enabled and controlled to increment on a rising edge of the clock signal CLK if the value SUM was less than the low range value of X, and is enabled and controlled to decrement on a rising edge of the clock signal CLK if the value SUM was above the high range value of Y, and is disabled and prevented from changing count if the value SUM was in the range between X and Y. The count of the up/down counter 94 is supplied to a digital-to-analog converter involving an analog multiplexer 95 and a resistor ladder involving resistors 96-104.

The up/down counter 94 controls which one of a set of node voltages (node voltages of the resistor ladder) will be output as the analog control signal 76.

In a condition in which there is too much current being sensed in the current sense resistor, the UP/DN digital signal will be high for an extended period. If the UP/DN digital signal 75 is high for long enough, then the digital accumulator/decrementer 92 will increment, and if the digital accumulator/decrementer 92 increments far enough that the SUM increases above the high range value Y (the upper bound of the midrange), then the UP/DN counter 94 will increment, and this incrementing of the UP/DN counter 94 will cause the magnitude of the voltage selected by analog multiplexer 95 to increase, and this will cause the voltage level of signal 76 to increase, and this will cause the voltage on the gate of FET 78 to decrease, and will cause less current to be sinked into the CONTROL terminal 49, which will decrease the magnitude of the control signal 49, and this decrease will cause the voltage on the FB terminal 50 to increase, and this will cause the PWM controller 28 of the primary side to decrease the on duty cycle of the primary side power FET, thereby decreasing power. Conversely, in a condition in which there is too little current being sensed in the current sense resistor, the UP/DN digital signal 75 will be low for an extended period. If the UP/DN digital signal 75 is low for long enough, then the digital accumulator/decrementer 92 will decrement, and if the digital accumulator/decrementer 92 decrements far enough that the SUM decreases below the low range value X, then the UP/DN counter 94 will increment, and this will cause the magnitude of the voltage selected by analog multiplexer 95 to increase, and this will cause the voltage of the signal 76 to increase, and this will cause the voltage on the gate of FET 78 to decrease, and this will decrease the magnitude of the control signal 48 to increase, and this will cause the voltage on the FB terminal 50 to increase, and this will decrease of the voltage on the FB terminal 50 will cause the PWM controller of the primary side to increase the on duty cycle of the primary side FET, thereby increasing power. The values of X and Y, the number of not connected ("NC") least significant bits of the UP/DN counter 94, the resistances of the resistors 96-104, and the frequency of the clock signal CLK are tailored to achieve the proper and desired feedback loop dynamics so that the flyback converter's VOUT does not oscillate.

Figure 5:
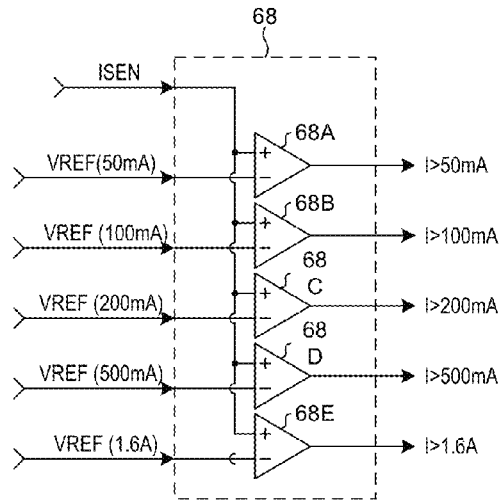
FIG. 5 is a circuit diagram of the current sense comparators circuit of FIG. 3.
Figure 6:
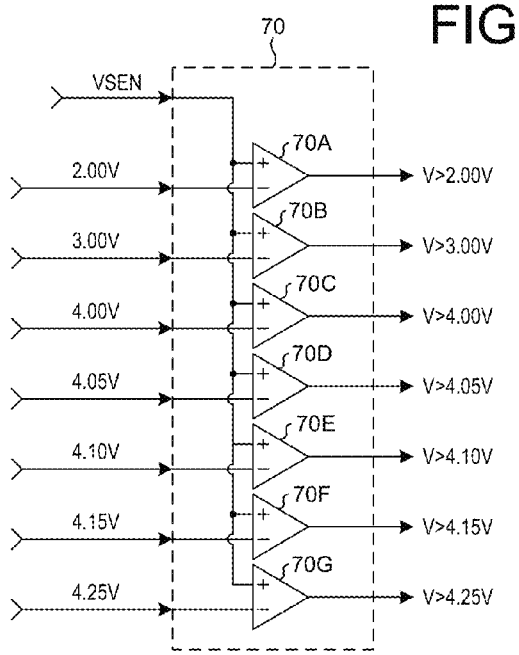
FIG. 6 is a circuit diagram of the voltage sense comparators circuit of FIG. 3.
Figure 7:
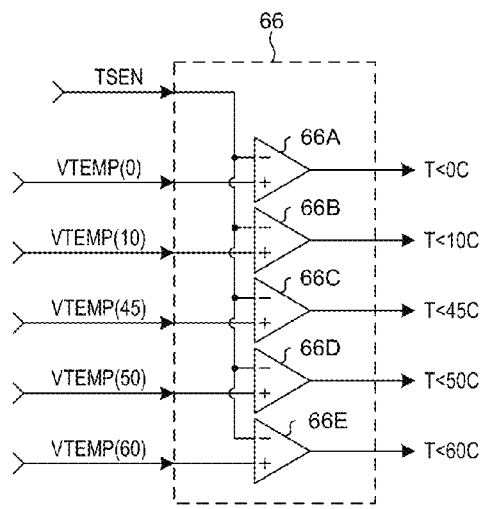
FIG. 7 is a circuit diagram of the temperature sense comparators circuit of FIG. 3.

FIG. 5 is a more detailed diagram of the current sense comparators circuit 68 of FIG. 3. The circuit comprises a set of comparators 68A-68E. FIG. 6 is a more detailed diagram of the current sense comparators circuit 70 of FIG. 3. The circuit comprises a set of comparators 70A-70G. FIG. 7 is a more detailed diagram of the current sense comparators circuit 66 of FIG. 3. The circuit comprises a set of comparators 66A-66E. In one example, all the comparators of FIGS. 5, 6 and 7 have an amount of hysteresis. It is to be understood that the circuit diagrams of FIGS. 5, 6 and 7 are just examples. In another embodiment, each comparator circuit has only one actual hysteresis comparator the use of which is time multiplexer. A digital circuit multiplexes the various comparison voltages one by one to the hysteresis comparator, and during each multiplexing time period detects the comparator output value, and then presents the resulting comparator output values as registered signals from the overall comparator circuit. This cycling through and testing of the various comparison voltages is done once shortly before the digital state machine clocked and might make a state transition.

Figure 8:
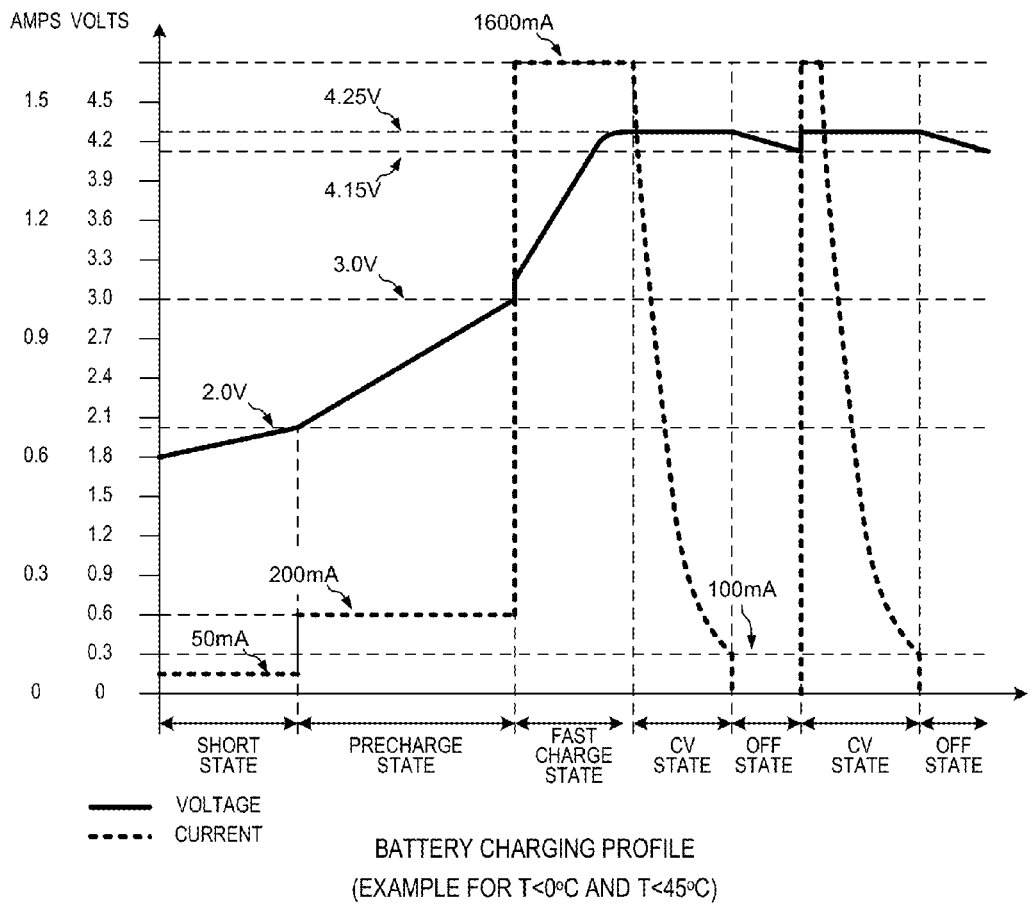
FIG. 8 is a diagram that illustrates a battery charging profile that is carried out by the single-stage AC-to-DC switching converter battery charger device of FIG. 1.
Figure 9:
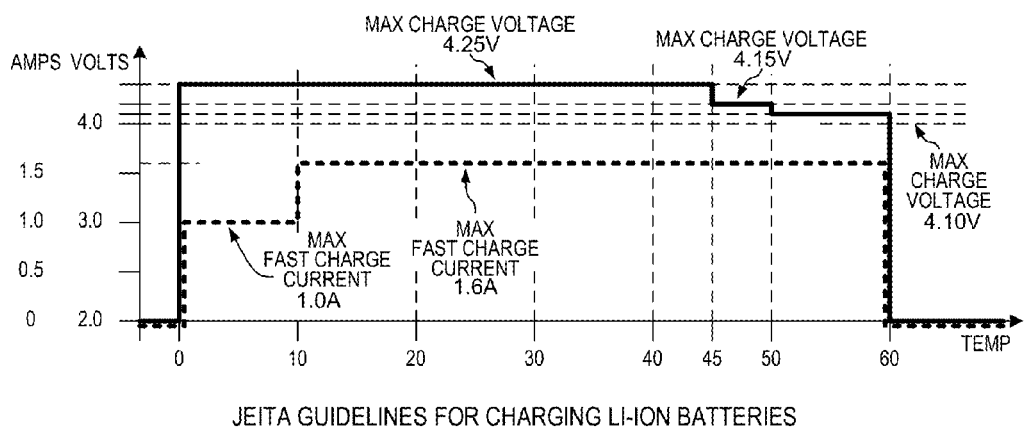
FIG. 9 is a diagram that illustrates how, in the battery charging profile of FIG. 8, the maximum charge current and maximum charge voltage vary as a function of battery temperature.

FIG. 8 and FIG. 9 are diagrams that set forth a battery charging profile that the battery charger device 2 can be configured to employ and follow in charging battery 4. If the battery is seriously discharged to the point that its voltage is less than 2.0 volts, then the battery is charged in a first constant current state (the so-called "Short State") with a fixed controlled constant charging current of 50 mA. Once the voltage of the battery reaches 2.0 volts, then the battery is charged in a second constant current state (the so-called "Precharge State") with a fixed controlled constant charging current of 200 mA. Once the voltage of the battery reaches 3.0 volts, then the battery is "fast charged" in a third constant current state (the so-called "Fast Charge State") with a fixed controlled constant charging current of 1.6 A if the temperature if between 10 degrees Celsius and 60 degrees Celsius, whereas if the temperature is between 0 degrees Celsius and 10 degrees Celsius then the fixed controlled constant charging current is 1.0 A. If the battery voltage reaches a maximum charge voltage, then the battery charger device switches to a constant voltage state (the so-called "Constant Voltage State") until the amount of current being supplied to the battery decreases to be less than 100 mA. This maximum charge voltage is 4.25 volts if the temperature is between 0 and 45 degrees Celsius, and is 4.15 volts if the temperature is between 45 and 50 degrees Celsius, and is 4.10 volts if the temperature is between 50 and 60 degrees Celsius. After the constant voltage state, when the current supplied to the battery falls to be less than 100 mA, then the battery charger device switches to an OFF state and no current is supplied to the battery. This OFF state condition persists until the battery voltage falls to a temperature dependent value (4.15 volts if the temperature is between 0 and 45 degrees Celsius, and 4.05 volts if the temperature is between 45 and 50 degrees Celsius, and 4.00 volts if the temperature is between 50 and 60 volts), at which point the battery charger device returns to the constant voltage state. Notwithstanding all of the above, if the temperature of the battery is less than 0 degrees Celsius or is greater than 60 degrees Celsius, then the battery charger device switches to the OFF state regardless of any voltages, or currents, or signal conditions.

Figure 10:
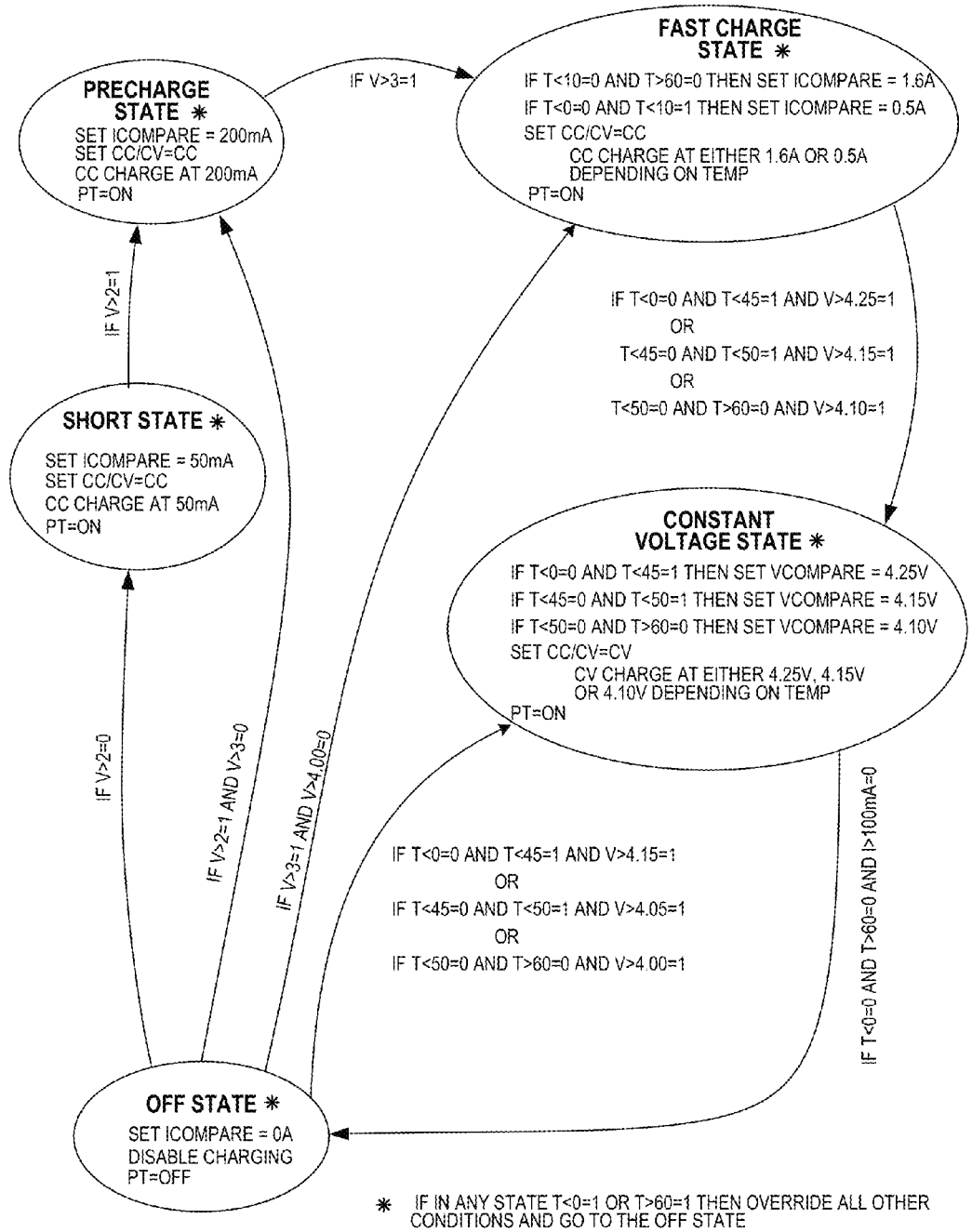
FIG. 10 is a state diagram of a digital state machine that is implemented by the digital state machine circuit within the secondary side battery charger controller integrated circuit of FIG. 3.

FIG. 10 is a state diagram for one configuration of the digital state machine circuit 91 of FIG. 3. In this configuration, there are five states: the OFF State, the Short State, the Precharge State, the Fast Charge State, and the Constant Voltage State. Each of the five states is illustrated as an oval. The actions and outputs of the digital state machine circuit 91 in a given state are indicated within the oval for that state. There are arrows shown between the state ovals. For a given state transition indicated by an arrow, the signal conditions that cause the state transition are indicated on the arrow. In addition to the state diagram illustrated, the digital state machine circuit 91 can alternatively be configured to implement another digital state machine that has another state diagram. The diagram of FIG. 10 is but one of these possible state diagrams. As mentioned above, the circuit designer who designs the integrated circuit 33 into the overall flyback converter causes the digital state machine circuit 91 to be configured in a desired way (to operate in accordance with one of several state diagrams) by selecting the proper values of the profile selection resistors 37 and 38.

Figure 11B:
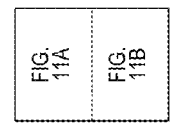
FIG. 11B is a second part of the state table for the digital state machine of FIG. 10.

FIG. 11A and FIG. 11B together are a larger figure, FIG. 11. FIG. 11 is a state table for the digital state machine circuit 91 of FIG. 3 when it is configured to implement a digital state machine that operates in accordance with the state diagram of FIG. 10, so that is will charge the battery 4 in accordance with the battery charging profile of FIG. 8 and FIG. 9. The digital state machine circuit 91 is clocked by the clock signal CLK, and therefore the digital state machine transitions states upon rising edges of the signal CLK.

In the present example, the digital state machine circuit 91 is implemented as a hardwired dedicated state machine. The number of the current state is represented as a multi-bit binary number stored in a plurality of sequential logic elements (for example, flip-flops). When in a given state, the multi-bit value (representing the number of the current state) stored in the sequential logic elements along with the values of the input signals are supplied as inputs to an amount of output combinatorial logic. From these signals (the input signals together with the current state number), the output combinatorial digital logic determines the proper values of the output signals of the state machine while the state machine is in that state. In addition, the current multi-bit state number (as output by the sequential logic elements) together with the values of the incoming signals are supplied as inputs to an amount of transition combinatorial digital logic. From these signals (the input signals together with the current state number), the transition combinatorial digital logic determines the multi-bit binary number of the next state. Upon the rising edge of the clock, the multi-bit number of the next state (as determined by the transition combinatorial logic) is clocked into the plurality of sequential logic elements so that the state machine will transition to the correct next state. If the state machine is not to transition to another state according to the state table on a given clock edge, then the multi-bit value as supplied onto the D-inputs of the flip-flops that hold the next state value is set to be the number of the current state. Boolean algebra is used to reduce the conditions as set forth in FIG. 11 into the amounts of combinatorial digital logic that generate the state machine output signals and that generate the next state number. As explained above, there are multiple such digital state machines programmed into the digital state machine circuit 91, one for each battery charging profile. The values of the profile selection resistors 37 and 38 determine which one of the multiple digital state machines is selected and active.

In another example, the digital state machine circuit 91 is implemented as a universal state machine in a memory (for example, a ROM), where a memory location stores both the multi-bit binary number of the next state, as well as a bit for the value of each state machine output signal value to be output from the state machine. The binary number of the next state as output by the memory is fed back to the address inputs of the memory and is concatenated with input signal values to generate the next multi-bit address that will be used to access the memory. Memory accesses are only allowed synchronously in response to edges of the signal CLK.

In yet another example, digital state machine circuit 91 is implemented in software as a program executed by a microcontroller. The microcontroller can be implemented as a second integrated circuit and can use serial communication (or any other method) or can be integrated into a single integrated circuit that monitors the state of the analog front end.

In one novel aspect, the selected digital state machine controls the external protection FET 44. The selected digital state machine determined the value of a PT output signal that is output from PT terminal 106, and this PT output signal drives a FET driver circuit 105 so that the FET driver circuit in turn drives the protection FET 44. In the state table of FIG. 11, a designation of PT=ON indicates that the protection FET 44 is controlled by the state machine to be turned on (conductive), whereas a designation of PT=OFF indicates that the protection FET 44 is controlled by the state machine to be turned off (non-conductive). The protection FET 44 is disposed in the charging current path between the primary side of the AC-to-DC switching converter and the battery being charged. Under certain fault conditions (for example, a battery over-temperature condition, a battery under-temperature condition, a battery over-voltage condition, or a battery under-voltage condition), and in the case of the battery being discharged in normal use when there is no charging going on, the digital state machine controls the external protection transistor 44 to be fully off, otherwise the digital state machine controls the external protection transistor 44 to be fully on. In the digital state machine described by the state diagram of FIG. 10 and the state table of FIG. 11, the state machine transitions to the OFF state under a fault condition (battery over-temperature, battery under-temperature, battery over-voltage, and battery under-voltage) and the state machine is in the OFF state when the battery is discharging under normal use.

Figure 12:
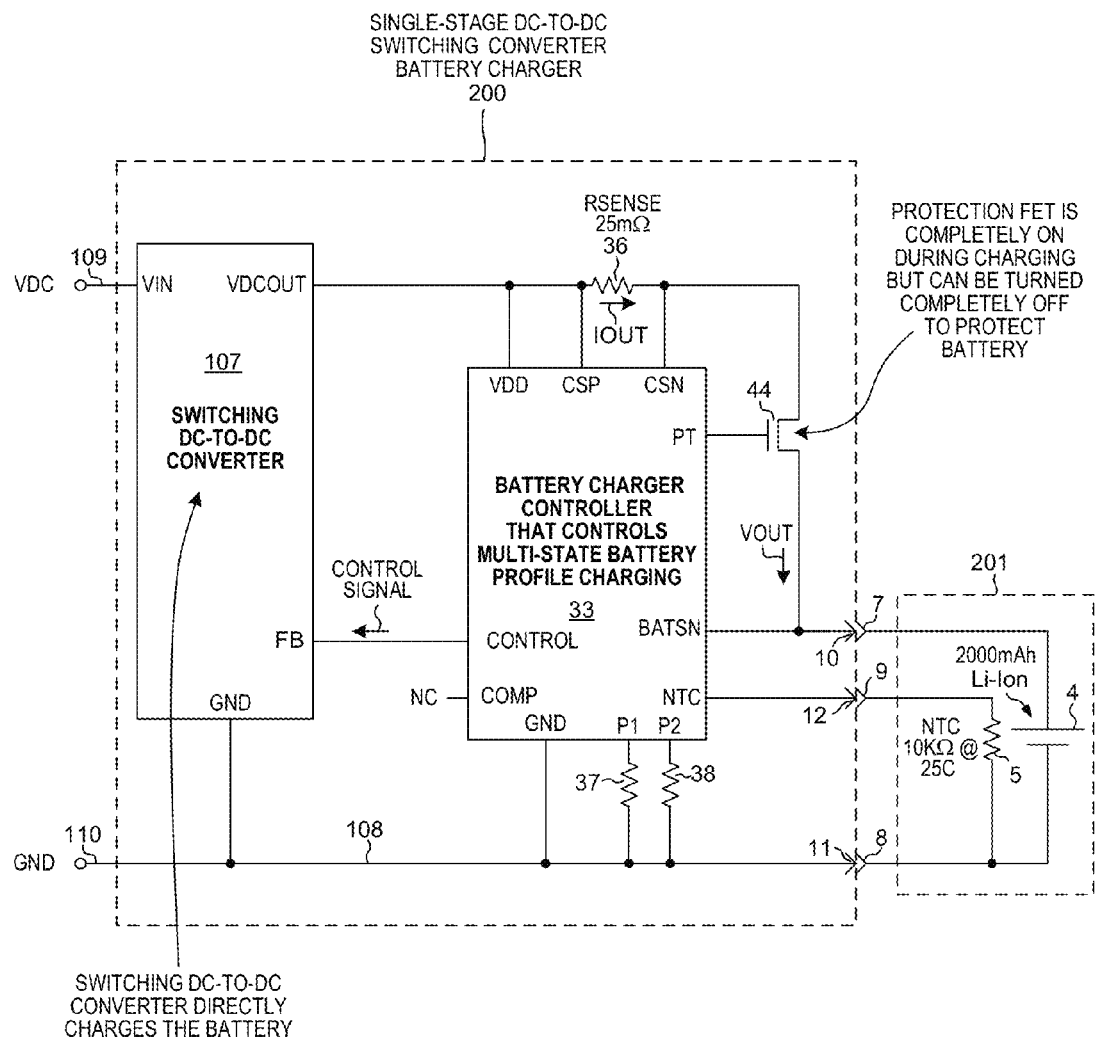
FIG. 12 is a diagram of an embodiment of a single-stage DC-to-DC switching converter battery charger that directly charges a rechargeable battery, where the battery charger controller integrated circuit is an identical copy of the controller integrated circuit used in the single-stage AC-to-DC switching battery charger of FIG. 2.

FIG. 12 is a diagram of another specific exemplary embodiment involving a single-stage DC-to-DC switching converter battery charger 200 and an external device 201 that has a rechargeable battery. The system of FIG. 12 is similar to the system of FIG. 2, except that rather than the single stage that directly charges the battery being an AC-to-DC switching converter, the single stage in the system of FIG. 12 is a DC-to-DC switching converter 107. The DC-to-DC switching converter receives a DC supply voltage via VDC terminal 109 and ground GND terminal 10 and directly charges the battery 4 under the control of the battery charger controller integrated circuit 33. Terminals 109 and 110 may, for example, be coupled to a bank of solar cells that output a DC supply voltage. Terminals 109 and 110 may, for example, be terminals of a plug that plugs into a 12 volt DC automobile cigarette lighter socket. The same integrated circuit 33 is usable in either the circuit topology of FIG. 2 or in the circuit topology of FIG. 12. In the circuit of FIG. 12, there is no optocoupler, and there is only one ground node 108.

In one example, reference numerals 10 and 11 identify the VDCOUT and GND terminals of a USB (Universal Serial Bus) plug at the end of a power cord. The battery charger controller integrated circuit should be disposed in the same device with the rechargeable battery so that it can maintain the appropriate charging profile (as set by 37 and 38). No intervening DC-to-DC converter is required or even desired to maximize charge delivered to the battery and to minimize battery charging time. The device 201 may include no such intervening DC-to-DC converter but rather the battery 4 is connected as illustrated in FIG. 12 so that the battery can be charged directly by the single-stage DC-to-DC switching converter battery charger 200.

Although certain specific embodiments are described above for instructional purposes, the teachings of this patent document have general applicability and are not limited to the specific embodiments described above. Although profile selection resistors are described above as a way of selecting, by means external to the secondary side battery charger controller integrated circuit, one of the plurality of battery charging profiles, one of numerous other suitable ways of making this selection can be employed in other embodiments. In one example, the type of battery is discernible through a USB connection to the battery assembly, and the controller integrated circuit determines the type of battery by interrogating the USB connector in the proper way and then selects one of the state machines and one of the battery charging profiles based on the type of battery. Other ways of setting the battery charging profile such as jumpers and switches can be used in other embodiments, in addition, serial digital communication, RF communication, or even optical communication. Although an optocoupler control signal path is described above as a way to communicate the control signal from the secondary side to the primary side, in other embodiments there is no optocoupler but rather the control signal is communicated from the secondary side to the primary side by another known feedback signal communication method such as by analog signaling, serial digital protocol communication, communication through the capacitor of a capacitive isolation barrier, secondary load pulsing so that information is communicated back through the transformer to the PWM controller, and other known methods of communicating feedback signals across an isolation barrier within an isolated power supply. In the case of the control signal being a serial digital protocol communication, a protocol encoder is embodied in the secondary side battery charger controller integrated circuit and a protocol decoder is embodied in the primary wide PWM controller integrated circuit. Although the transistor 44 as described above is controlled to be on of off by the digital state machine, in another embodiment an analog control circuit for linear charge control is provided to drive the transistor 44, and the state machine operates together with the analog control circuit to minimize power loss in the linear charging transistor 44. Accordingly, various modifications, adaptations, and combinations of various features of the described embodiments can be practiced without departing from the scope of the invention as set forth in the claims.

What is claimed is:

1. A battery charger device for charging a rechargeable battery, the battery charger device comprising:
    an output terminal adapted to be coupled to a battery assembly, wherein the rechargeable battery is a part of the battery assembly;
    a pair of AC supply voltage input terminals;
    a single-stage AC-to-DC switching converter circuit that receives a 110 volt AC RMS supply voltage from the pair of AC supply voltage input terminals and that supplies a charging current through the output terminal and to the battery, wherein the single-stage AC-to-DC converter comprises:
    a primary side circuit that comprises a pulse width modulator (PWM) integrated circuit and a primary winding of a transformer; and
    a secondary side circuit that comprises a secondary winding of the transformer, a current sense resistor, and a battery charger controller integrated circuit, wherein the battery charger controller integrated circuit detects a voltage on the output terminal and detects a current supplied to the rechargeable battery via the output terminal and sends a control signal to the PWM integrated circuit of the primary side circuit such that the rechargeable battery is charged in accordance with a multi-state battery charging profile, wherein the multi-state battery charging profile includes a constant current (CC) charging state and a constant voltage (CV) charging state, wherein a charging current supplied to the battery flows from the secondary winding, through the current sense resistor, through the output terminal, and into the battery without passing into the battery charger controller integrated circuit and without passing through any switching converter power stage and without passing through any linear regulator power stage, and wherein the battery charger controller integrated circuit comprises:
    a digital state machine circuit, wherein the digital state machine circuit is configured to implement a digital state machine, wherein the digital state machine is in a first state when the battery charger device is charging in the CC charging state, and wherein the digital state machine is in a second state when the battery charger device is charging in the CV charging state.

2. The battery charger device of claim 1, wherein the multi-state battery charging profile is one of a plurality of multi-state battery charging profiles, and wherein the battery charger controller integrated circuit sends the control signal to the PWM integrated circuit of the primary side circuit such that the battery is charged in accordance with a selectable one of the plurality of multi-state battery charging profiles.

3. The battery charger device of claim 2, wherein the battery charger controller integrated circuit further comprises:
    a first integrated circuit terminal coupled to a first lead of the current sense resistor;
    a second integrated circuit terminal coupled to a second lead of the current sense resistor;
    an amplifier that outputs a first voltage that is proportional to a voltage dropped across the current sense resistor;
    a reference voltage selector circuit that outputs a second voltage, wherein the second voltage is a selected one of a plurality of reference voltages;
    a comparator that receives the first voltage from the amplifier and that receives the second voltage from the reference voltage selector circuit, and that outputs a digital signal, wherein the digital state machine circuit outputs a control signal that determines which one of the plurality of reference voltages will be output by the reference voltage selector circuit;
    a control signal output terminal; and
    an Integrator and Control Signal Generator (ICSG) circuit coupled to receive the digital signal from the comparator, wherein the ICSG circuit generates the control signal, and wherein the control signal is output from the battery charger controller integrated circuit via the control signal output terminal.

4. The battery charger device of claim 3, wherein the digital state machine circuit is taken from the group consisting of: a hardwired digital state machine that includes no addressable memory device, a programmed universal state machine that stores state transition information in a single memory device, a programmed microcontroller.

5. The battery charger device of claim 3, wherein the digital state machine circuit is a programmed universal state machine that stores state transition information in a single memory device.

6. The battery charger device of claim 4, wherein the control signal passes out of a terminal of the battery charger controller integrated circuit, and through an optocoupler, and into a terminal of the PWM integrated circuit.

7. The battery charger device of claim 1, further comprising:
    a housing that houses the single-stage AC-to-DC switching converter circuit, wherein the battery assembly is not disposed within the housing, wherein each terminal of the pair of AC supply voltage input terminals has a surface that is accessible from outside the housing.

8. The battery charger device of claim 1, further comprising:
    a housing that houses the single-stage AC-to-DC switching converter circuit, wherein the battery assembly is not disposed within the housing, wherein the pair of AC supply voltage input terminals is a pair of coplanar straight metal blades of a standard NEMA (National Electrical manufacturers Association) wall power plug, wherein the pair of blades extends from the housing.

9. The battery charger device of claim 1, further comprising:
a housing that houses the single-stage AC-to-DC switching converter circuit, wherein the battery assembly is not disposed within the housing; and
a power cord that extends from the housing and terminates in a standard NEMA (National Electrical manufacturers Association) wall power plug, wherein the pair of AC supply voltage input terminals is a pair of coplanar straight metal blades of the standard NEMA wall power plug.

10. The battery charger device of claim 1, wherein the secondary side circuit further comprises:
a protection transistor, wherein the charging current supplied to the battery flows in a current path from the secondary winding, through the current sense resistor, through the protection transistor, and to the output terminal, and wherein the digital state machine circuit controls the protection transistor by outputting a protection transistor control signal, wherein the protection transistor control signal passes out of a protection transistor output terminal of the battery charger controller integrated circuit and to the protection transistor.

11. The battery charger device of claim 1, wherein the secondary side circuit further comprises:
at least one profile selection resistor, wherein the profile selection resistor has a value, and wherein the value of the profile selection resistor at least in part determines which one of a plurality of digital state machines is implemented by the digital state machine circuit.

12. The battery charger device of claim 11, wherein the plurality of digital state machines is preprogrammed into the digital state machine circuit, but where only one of the plurality of digital state machines is selected and implemented at a given time.

13. The battery charger device of claim 1, wherein the digital state machine circuit is configured to implement a selected one of a plurality of selectable digital state machines.

14. A secondary side battery charger controller integrated circuit, comprising:
a first current sense terminal;
a second current sense terminal;
a battery voltage sense terminal;
a battery temperature detection signal input terminal;
a control output signal terminal;
an amplifier that outputs a first voltage that is proportional to a voltage between the first and second current sense terminals;
a first reference voltage selector circuit that outputs a second voltage, wherein the second voltage is a selected one of a plurality of reference voltages;
a first comparator circuit that compares the first voltage to the second voltage and that outputs a first digital signal;
a second reference voltage selector circuit that outputs a third voltage, wherein the third voltage is a selected one of a plurality of reference voltages;
a second comparator circuit that determines whether a voltage on the battery voltage sense terminal is above the third voltage, and that outputs a second digital signal;
a control signal generating circuit that receives a selected one of the first and second digital signals and that generates a control signal, and wherein the control signal is output from the secondary side battery charger controller integrated circuit via the control signal output terminal; and
a digital state machine circuit that controls the first reference voltage selector circuit and that controls the second reference voltage selector circuit, wherein a plurality of digital state machines is preprogrammed into the digital state machine circuit, but wherein only one of the digital state machines is selected and implemented at a given time.

15. The secondary side battery charger controller integrated circuit of claim 14, further comprising:
a protection transistor output terminal, wherein the digital state machine circuit causes a protection transistor control signal to be output from the protection transistor output terminal.

16. The secondary side battery charger controller integrated circuit of claim 14, wherein the control signal generating circuit comprises an integrator, wherein the integrated is taken from the group consisting of: a digital integrator, an analog integrator.

17. The secondary side battery charger controller integrated circuit of claim 14, wherein the control signal that is output from the control signal output terminal is an analog current signal that is sinked into the control signal output terminal, and wherein the secondary side battery charger controller integrated circuit controls a magnitude of the current that is sinked.

18. The secondary side battery charger controller integrated circuit of claim 14, further comprising:
a temperature sense comparator circuit that receives a voltage present on the battery temperature detection signal input terminal and that generates digital signals indicative of a temperature of a battery, wherein the digital signals indicative of the temperature of the battery are supplied to the digital state machine circuit.

19. The secondary side battery charger controller integrated circuit of claim 14, further comprising:
means for selecting one of the digital state machines that are preprogrammed into the digital state machine circuit so that the selected digital state machine is selected and implemented.

20. The secondary side battery charger controller integrated circuit of claim 14, wherein a flyback converter has a primary side and a secondary side, wherein the secondary side battery charger controller integrated circuit outputs a control signal from the control signal output terminal that is supplied to a pulse width modulator circuit of the primary side of the flyback converter, and wherein the secondary side battery charger controller integrated circuit is a part of the secondary side of the flyback converter.

21. A battery charger device for charging a rechargeable battery, the battery charger device comprising:
an output terminal adapted to be coupled to a battery assembly, wherein the rechargeable battery is a part of the battery assembly;
a pair of AC supply voltage input terminals;
a single-stage AC-to-DC switching converter circuit that receives a 110 volt AC RMS supply voltage from the pair of AC supply voltage input terminals and that supplies a charging current through the output terminal and to the battery, wherein the single-stage AC-to-DC converter comprises:
a primary side circuit that comprises a pulse width modulator (PWM) integrated circuit and a primary winding of a transformer; and a secondary side circuit that comprises a secondary winding of the transformer, a current sense resistor, a transistor, and a battery charger controller integrated circuit, wherein the battery charger controller integrated circuit controls the transistor, wherein the battery charger controller integrated circuit detects a voltage on the output terminal and detects a current supplied to the rechargeable battery via the output terminal and sends a control signal to the PWM integrated circuit of the primary side circuit such that the rechargeable battery is charged in accordance with a multi-state battery charging profile, wherein the multi-state battery charging profile includes a constant current (CC) charging state and a constant voltage (CV) charging state, and wherein a charging current supplied to the battery flows from the secondary winding, through the current sense resistor, through the transistor, through the output terminal, and into the battery.

* * * * *